No. 619,486. Patented Feb. 14, 1899.
J. JACOBSON & E. WESSMAN.
PULLEY COVERING.
(Application filed Dec. 19, 1898.)
(No Model.)
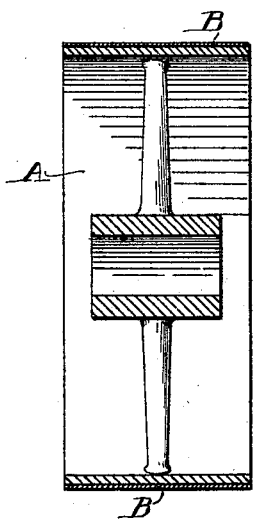
Witnesses:
E. F. Dowling.
J. A. Hollenbeck
Inventors:
John Jacobson,
Engel Wessman,
Per W. N. Morrison,
Atty.

UNITED STATES PATENT OFFICE.

JOHN JACOBSON AND EMIL WESSMAN, OF ROCKFORD, ILLINOIS.

PULLEY-COVERING.

SPECIFICATION forming part of Letters Patent No. 619,486, dated February 14, 1899.

Application filed December 19, 1898. Serial No. 699,685. (No model.)

*To all whom it may concern:*

Be it known that we, JOHN JACOBSON and EMIL WESSMAN, citizens of the United States of America, residing at Rockford, in the county of Winnebago and State of Illinois, have invented a certain new and useful Improvement in Pulley-Coverings; and we declare the following to be a full, clear, and exact description of the invention, such as will enable others skilled in the art to which it pertains to make and use the same, reference being had to the accompanying drawing, which forms a part of this specification.

Our invention relates to and has for its object the production of a pulley-covering which is applicable to the peripheries of pulleys while in a semi fluid or plastic form and which by setting thereon and adhering thereto forms a sure means of preventing the slipping of their belts.

The drawing shows a sectional view of a pulley having our covering operatively applied to the periphery thereof.

In carrying out our invention A represents the sectional pulley, and B our improved anti-belt-slip pulley-covering. This covering consists of a mixture composed of liquid glue, calcined calcareous gypsum, and sugar.

While the proportions of the above-mentioned materials may be somewhat varied and yet produce a more or less successful result, we prefer the following proportions: one gallon of liquid glue, eight pounds of calcined calcareous gypsum, and eight ounces of sugar, all thoroughly mingled together.

We prefer to use in manufacturing our pulley-covering Le Page's liquid glue, which is a strong fish-glue of uniform and excellent quality and universally known to users of glue.

The calcined calcareous gypsum or calcined plaster-of-paris, which is the same substance that is employed in making plaster casts and stucco-work, should be freshly calcined, so that when it is mixed with water it will "set" or harden in a few minutes.

Should it be desirable to color the mixture, about eight ounces of any ground mineral pigment may be added to each gallon thereof.

The covering is applied to the peripheries of pulleys by means of a brush. Should it be too thick to spread readily, it may be thinned by adding thereto and thoroughly stirring in water until it is of the proper consistency.

The well-known setting properties of calcined calcareous gypsum will cause a layer thereof deposited on the periphery of a pulley to become very hard. The sugar employed in the mixture renders both the gypsum and glue less brittle, and the glue secures the band of set gypsum to the periphery of a pulley.

We are aware that others have heretofore applied mixtures, composed of glue and gritty substances, to the peripheries of pulleys to prevent the slipping of belts thereon; but in all such mixtures the strength of the glue employed has been the measure of the strength and durability of the covering thereby produced, while the setting properties of calcined calcareous gypsum, combined with the cohesive and adhesive properties of glue, tempered and toughened by the addition of sugar, constitute the measure of strength and durability of our pulley-covering.

What we claim is—

A pulley-covering comprising liquid glue, calcined calcareous gypsum and sugar mingled and combined, substantially as and for the purpose set forth.

In testimony whereof we sign our names to this specification, in the presence of two witnesses, this 15th day of December, 1898.

JOHN JACOBSON.
    EMIL WESSMAN.

Witnesses:
  L. L. MORRISON,
  NELLIE BUNKER.